US011106481B2

(12) United States Patent
Tsirkin (10) Patent No.: US 11,106,481 B2
(45) Date of Patent: Aug. 31, 2021

(54) SAFE HYPER-THREADING FOR VIRTUAL MACHINES

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 208 days.

(21) Appl. No.: 16/389,904

(22) Filed: Apr. 19, 2019

(65) Prior Publication Data
US 2020/0334062 A1    Oct. 22, 2020

(51) Int. Cl.
*G06F 9/455* (2018.01)
*G06F 9/48* (2006.01)

(52) U.S. Cl.
CPC ........ *G06F 9/45558* (2013.01); *G06F 9/4881* (2013.01); *G06F 2009/4557* (2013.01); *G06F 2009/45595* (2013.01)

(58) Field of Classification Search
CPC ............... G06F 9/45558; G06F 9/4881; G06F 2009/45595; G06F 2009/4557; G06F 9/45533; G06F 9/5077; G06F 9/4843
See application file for complete search history.

(56) References Cited

U.S. PATENT DOCUMENTS

| | | | |
|---|---|---|---|
| 9,785,460 B2 | 10/2017 | Zheng | |
| 2009/0007112 A1* | 1/2009 | Moriki | G06F 9/45558 718/1 |
| 2010/0138208 A1* | 6/2010 | Hattori | G06F 9/4812 703/25 |
| 2011/0154318 A1* | 6/2011 | Oshins | G06F 3/0647 718/1 |
| 2014/0149633 A1* | 5/2014 | Tsirkin | G06F 9/45558 711/6 |
| 2015/0242226 A1 | 8/2015 | Palavalli et al. | |

(Continued)

FOREIGN PATENT DOCUMENTS

CN    108959020 A    12/2018

OTHER PUBLICATIONS

Bilder, Susan, "Maximizing VMware Performance and CPU Utilization," Feb. 22, 2017, 10 pgs., accessed Jan. 3, 2019 at https://blog.heroix.com/blog/vmware-vcpu-over-allocation.

(Continued)

*Primary Examiner* — Benjamin C Wu
(74) *Attorney, Agent, or Firm* — Lowenstein Sandler LLP (57) ABSTRACT

A hypervisor detects a VM exit issued by a first virtual processor of a virtual machine, where the first virtual processor is associated with a first logical processor of a host CPU, and determines that a second virtual processor of the virtual machine is associated with a second logical processor of the host CPU. The hypervisor determines the execution state of the second virtual processor. Responsive to determining that the execution state of the second virtual processor indicates that the second virtual processor is running, the hypervisor sends a first instruction to the second logical processor to cause the second virtual processor to return control to the hypervisor. Responsive to determining that the execution state of the second virtual processor indicates that the second virtual processor has returned control to the hypervisor, the hypervisor executes a hypervisor task using the first logical processor.

19 Claims, 5 Drawing Sheets

(56) References Cited

U.S. PATENT DOCUMENTS

| | | | |
|---|---|---|---|
| 2016/0011895 A1* | 1/2016 | Tsirkin | G06F 9/461 718/1 |
| 2017/0337073 A1* | 11/2017 | Tsirkin | G06F 13/102 |
| 2018/0143828 A1 | 5/2018 | Tsirkin | |
| 2018/0239626 A1 | 8/2018 | Tsirkin | |
| 2018/0285135 A1* | 10/2018 | Oks | G06F 9/485 |
| 2018/0373441 A1* | 12/2018 | Nassi | G06F 3/067 |

OTHER PUBLICATIONS

Jones, Bill "Will Hyper-Threading Improve Processing Performance?" Dasher Technologies, Jan. 23, 2014, 7 pgs., accessed Jan. 3, 2019 at https://www.dasher.com/will-hyper-threading-improve-processing-performance/.

Williams, Chris, "Meet TLBleed: A crypto-key-leaking CPU attack that Intel reckons we shouldn't worry about," Jun. 22, 2018, 11 pgs., accessed Jan. 3, 2019 at https://www.theregister.co.uk/2018/06/22/intel_tlbleed_key_data_leak/.

* cited by examiner

SAFE HYPER-THREADING FOR VIRTUAL MACHINES

TECHNICAL FIELD

The present disclosure is generally related to computer systems, and more particularly, to hyper-thread management in virtualized computer systems.

BACKGROUND

A virtual machine (VM) is an emulation of a computer system. When executed on appropriate hardware, a VM creates an environment allowing the virtualization of an actual physical computer system (e.g., a server, a mainframe computer, etc.). The actual physical computer system is typically referred to as a "host machine." Typically, a component on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS." In some implementations, the guest OS and applications executing within the guest OS can be collectively referred to as the "guest."

A virtual machine may comprise one or more "virtual processors" (VCPUs), each of which maps, possibly in a many-to-one fashion, to a central processing unit (CPU) of the host machine. The hypervisor can manage these mappings in a transparent fashion, thereby enabling the guest operating system and applications executing on the virtual machine to interact with the virtual processors as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for safe hyper-threading for virtual machines. Hyper-threading technology allows the sharing of CPU resources by presenting multiple logical processors (or threads) as part of a single physical processor. This allows the logical processors to execute simultaneously on the single physical core in different security domains and privilege modes. In virtualized systems, hyper-threading technology can be implemented such that one thread can be executing in hypervisor mode while another is executing code within a virtual machine (e.g., as a virtual processor). Similarly, two threads of a single physical processor can be assigned to execute code simultaneously within two different virtual machines. Hyper-threading, however, can expose systems to significant security risks since logical processors share CPU resources, allowing the leaking of information between software components running on different threads on the same CPU. Thus, it may be possible for sensitive data stored in cache by one thread to be accessible to another thread on the same physical processor.

Some conventional systems mitigate this risk by incorporating scheduling logic in the hypervisor that acts as a gatekeeper for scheduling virtual processors of virtual machines. In such implementations, only virtual processors of the same virtual machine may run on threads of the same host CPU, preventing information from leaking between two different virtual machines. This solution, however, still presents a security risk since one thread can still be executing code from a virtual machine while another thread may be executing hypervisor code. Thus, in some situations, the virtual machine could still gain access to sensitive data accessible to the hypervisor. Other conventional systems mitigate this risk by disabling hyper-threading completely. This solution, however, significantly reduces the performance of the CPU.

Aspects of the present disclosure address the above noted and other deficiencies by implementing safe hyper-threading for virtual machines (VMs). The hypervisor can be configured to detect and trap VM exits initiated by a virtual processor of a virtual machine that executes on a thread of a hyper-threaded CPU. A VM exit refers to a transfer of control from a virtual machine to the hypervisor. The hypervisor can then configure the execution state of any other virtual processors from the same virtual machine to prevent the simultaneous execution of the hypervisor and virtual machine code on threads (logical processors) of the same CPU. Once the hypervisor has completed a task, it can signal virtual processors on the same CPU that it is safe to resume execution.

Aspects of the present disclosure present significant advantages over conventional solutions to the data leakage issues noted above. First, since virtual machine code can be prevented from executing while the hypervisor is simultaneously executing on the same CPU, sensitive information accessible to the hypervisor can be blocked from leaking to virtual machines running on the same CPU. Moreover, by preventing the hypervisor and virtual machine from running simultaneously on the same CPU, the performance benefits of hyper-threading can be retained, rather than being disabled completely. Thus, thread performance can be retained while simultaneously minimizing security risk of leaks. Moreover, managing hyper-threading in this way can significantly improve on-going security of virtualized systems. Unauthorized intrusion attacks can be prevented without knowing the specific details of the attack method since the hypervisor and virtual machine should not execute simultaneously.

Figure 1:
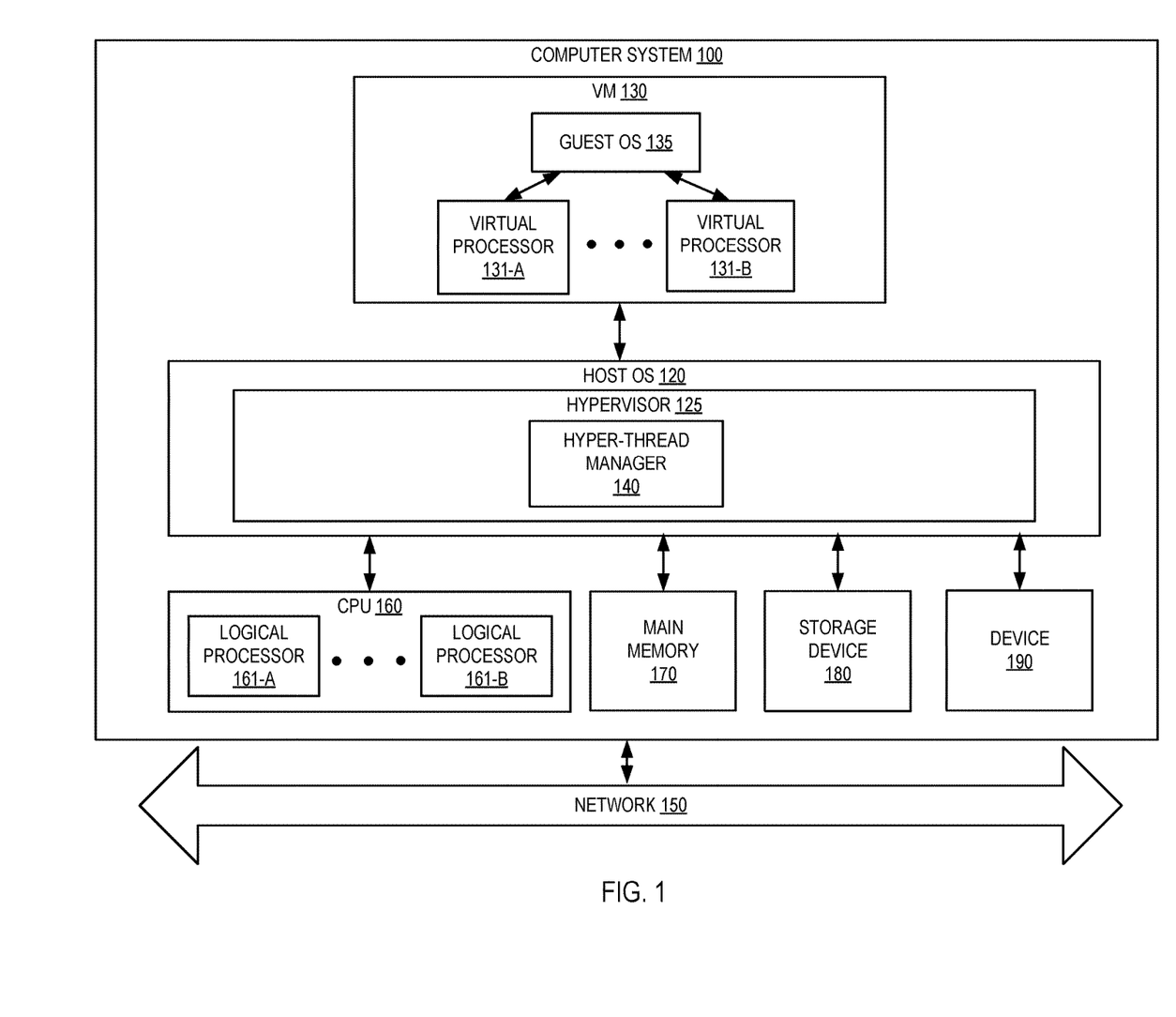
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. Other architectures for computer system 100 are possible, and implementation of a computer system utilizing examples of the present disclosure is not limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160. It should be noted that although, for simplicity, a single CPU 160, storage device 180, and device 190 are depicted in FIG. 1, other implementations of computer system 100 may comprise a plurality of CPUs, storage devices, and devices.

CPU 160 may be configured to support hyper-threading by permitting logical processors 161-A, 161-B to execute simultaneously on the single physical core of CPU 160. It should be noted that although, for simplicity, two logical processors 161 have been depicted in FIG. 1, in other implementations, CPU 160 may comprise more than two logical processors 161.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 may additionally comprise a virtual machine (VM) 130. VM 130 may be an application environment that executes programs as though it was an actual physical machine. VM 130 may comprise a guest operating system (OS) 135, and virtual processors 131-A and 131-B. Guest OS 135 may handle the execution of applications within the virtual machine. Virtual processors 131-A and 131-B may be used by guest OS 135 to handle the execution of applications, as well as for guest OS functions within the virtual machine. It should be noted that although, for simplicity, a single VM 130 is depicted in FIG. 1, computer system 100 may host a plurality of VMs 130.

Periodically, virtual machine code (e.g., a guest OS, an application executing within the VM, etc.) may return control to the hypervisor. This may occur as a result of an input/output (I/O) request (e.g., data read, data write, attempt to access an IO device 190, etc.), the attempt to execute a privileged instruction, an attempt to access a privileged or protected area of memory that generates a memory page fault, cause the virtual processor to enter an idle state (e.g., via a VM HALT instruction), or the like. In such situations, a virtual machine exit (VM exit) may be triggered that initiates a transfer of execution control of a logical processor 161 to hypervisor 125 from the virtual processor 131 of VM 130. Hypervisor 125 can then determine the cause of the VM exit and process it (e.g., process the I/O request, handle the page fault, assign the logical processor to another task, etc.). Once the VM exit has been handled, hypervisor 125 can resume execution of the VM by executing an instruction to re-enter the VM (e.g., a "VM enter").

Each virtual processor 131 is a component that emulates a physical processor, and that maps to one of central processing units (CPU) 160, possibly in a many-to-one fashion. In some implementations, each virtual processor 131 may map to one of logical processors 161 of CPU 160. For example, virtual processor 131-A may map to logical processor 161-A, and virtual processor 131-B may map to logical processor 161-B. Alternatively virtual processor 131-A may map to one of logical processors 161-A or 161-B, while virtual processor 131-B may map to a logical processor of another CPU (not pictured). It should be noted that the number of virtual processors may or may not be the same as the number of CPUs or logical processors. In some implementations, hypervisor 125 manages these mappings in a transparent fashion, so that guest OS 135 and applications executing on virtual machine 130 interact with virtual processors 131 as though they were actual physical processors.

Computer system 100 may also include a host operating system (OS) 120, which may comprise software, hardware, or both, that manages the hardware resources of the computer system and that provides functions such as interprocess communication, scheduling, virtual memory management, and so forth. In some examples, host operating system 120 also comprises a hypervisor 125, which provides a virtual operating platform for virtual machine (VM) 130 and that manages its execution. It should be noted that in some other examples, hypervisor 125 may be external to host OS 120, rather than embedded within host OS 120.

Hypervisor 125 can include a hyper-thread manager 140 that implements safe hyper-threading for virtual machines. Hyper-thread manager 140 can detect and trap exits initiated by a virtual processor 131 of VM 130 that executes on a logical processor 161 (a thread) of a hyper-threaded CPU 160. Hyper-thread manager 140 can then configure the execution state of any other virtual processor 131 of VM 130 to prevent the simultaneous execution of the hypervisor 125 and virtual machine code (e.g., code executing using one of virtual processors 131 of VM 130) on logical processors 161 of the same CPU 160. Once the hypervisor has completed a task, hyper-thread manager 140 can signal logical processors 161 on the CPU 160 that it is safe to resume execution of any suspended virtual processors 131.

In an illustrative example, hyper-thread manager 140 can detect a VM exit issued by virtual processor 131-A of VM 130, where virtual processor 131-A is associated with logical processor 161-A of CPU 160 (e.g., executed by a thread of a hyperthreaded CPU). The VM exit may thus transfer execution control of logical processor 161-A to hypervisor 125. Hyper-thread manager 140 can then determine whether virtual processor 131-B of VM 130 is associated with logical processor 161-B of CPU 160 (e.g., another thread of the same CPU). If so, hyper-thread manager 140 can then determine the execution state of virtual processor 131-B and take action to ensure that virtual processor 131-B and hypervisor 125 are not simultaneously executing using logical processor 161-A and logical processor 161-B respectively. Hyper-thread manager 140 is described in further detail below with respect to FIG. 2.

Figure 2:
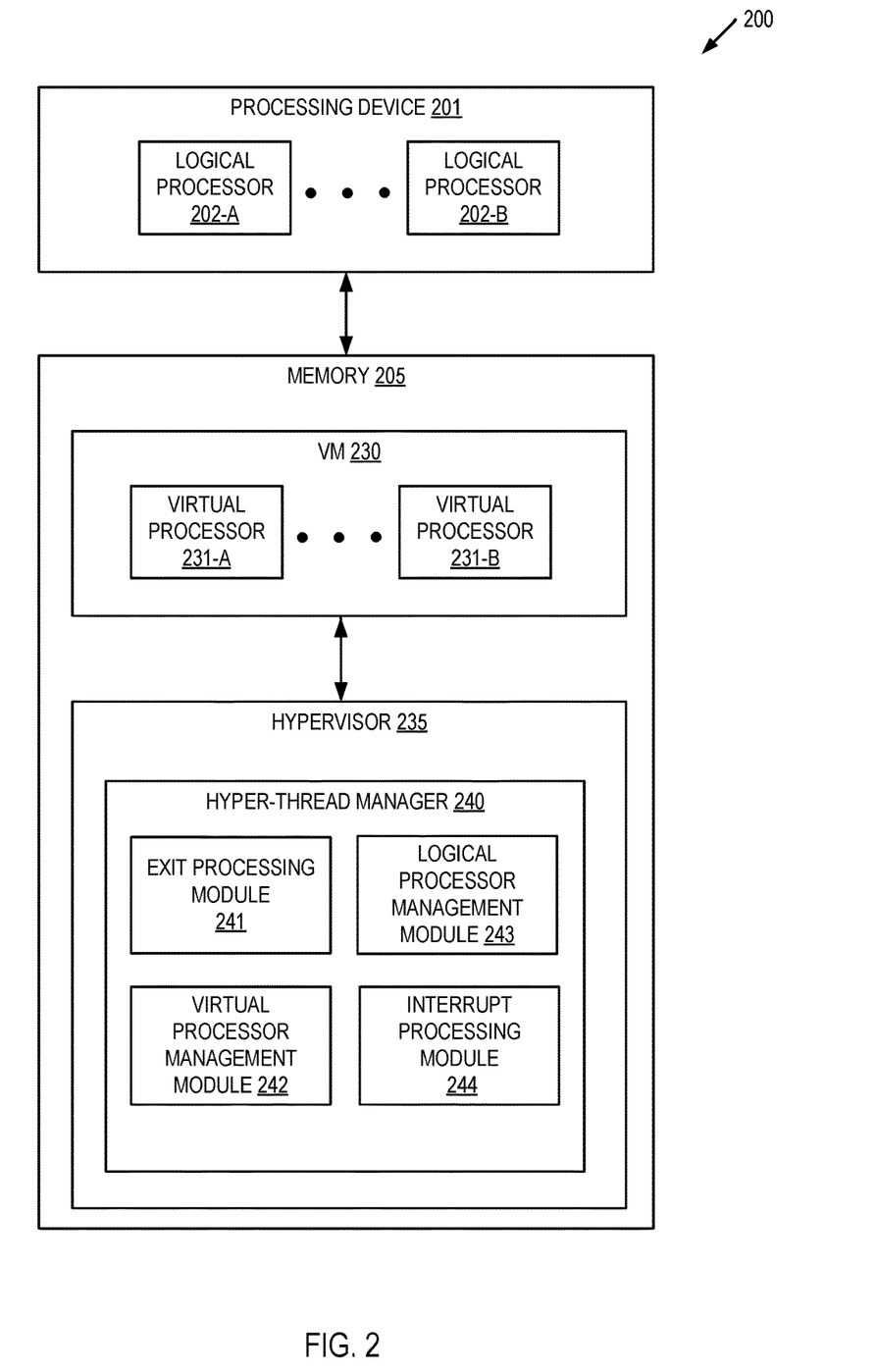
FIG. 2 depicts a block diagram illustrating an example of a hyper-thread manager for facilitating safe hyper-threading for virtual machines, in accordance with one or more aspects of the present disclosure.

FIG. 2 depicts a block diagram illustrating an example a hyper-thread manager 240 for facilitating safe hyper-threading for virtual machines. In some implementations, hyper-thread manager 240 may correspond to hyper-thread manager 140 of FIG. 1. As shown in FIG. 2, hyper-thread manager 240 may be a component of a computing apparatus 200 that includes a processing device 201, operatively coupled to a memory 205, to execute a hypervisor 235. In some implementations guest hypervisor 235 may correspond to hypervisor 125 of FIG. 1. In some implementations, processing device 201 and memory 205 may correspond to processing device 502 and main memory 504 respectively as described below with respect to FIG. 5.

Hyper-thread manager 240 may include exit processing module 241, virtual processor management module 242, logical processor management module 243, and interrupt processing module 244. Alternatively, the functionality of one or more of exit processing module 241, virtual processor management module 242, logical processor management module 243, and interrupt processing module 244 may be combined into a single module or divided into multiple sub-modules.

Exit processing module 241 is responsible for detecting VM exits issued by virtual processors 231-A, 231-B of VM 230. As noted above, a VM exit may be triggered when virtual machine code returns execution control of a logical processor to hypervisor 235. This may occur as a result of an I/O request (e.g., data read, data write, attempt to access an I/O device 190, etc.), the attempt to execute a privileged instruction, an attempt to access a privileged or protected area of memory that generates a memory page fault, cause the virtual processor to enter an idle state (e.g., via a VM HALT instruction), or the like. For example, VM code may be executing using virtual processor 231-A, which is associated with logical processor 202-A of processing device 201 (e.g., a thread of the CPU). The VM code may conduct an I/O operation that triggers a VM Exit that transfers execution control of logical processor 202-A to hypervisor 235. Similarly, the VM code may determine that virtual processor 231-A may not have any work to complete, and should therefore enter an idle state. In such instances, a VM exit may be issued via a HALT instruction that places virtual processor 231-A in the idle state, and transfers execution control of logical processor 202-A to hypervisor 235 to be assigned to another task.

In some implementations, exit processing module 241 may determine the type of VM Exit issued by virtual processor 231-A, and manage the execution of virtual processor 231-B (and any other virtual processors for VM 230 assigned to logical processors on processing device 201) differently based on the type of VM Exit. For example, if virtual processor 231-A issues a VM exit with the expectation that execution control of logical processor 202-A should be returned to the VM (e.g., and I/O request, page fault, etc.), logical processor 202-B (associated with virtual processor 231-B) may be immediately halted while the hypervisor 235 retains execution control of logical processor 202-A. Thus, virtual processor 231-B should be prevented from executing simultaneously with the hypervisor 235. This process is described below with respect to FIG. 3.

Virtual processor management module 242 is responsible for management of virtual processors 231-A and 231-B of VM 230 within the system 200. Once a VM exit has been detected and its type determined, hyper-thread manager 240 may then invoke virtual processor management module 242 to determine whether any additional virtual processors 231 are associated with logical processors 202 of the same processing device 201. For example, if virtual processor 231-A of VM 230 issues a VM exit to transfer execution control of logical processor 202-A, virtual processor management module 242 may determine that virtual processor 231-B of VM 230 is associated with logical processor 202-B (e.g., a second thread of the same of processing device 201). This determination may be made by accessing a data structure managed by the hypervisor 235 that maintains all known virtual processors, their corresponding execution state, and any logical processors to which they have been given execution control.

Virtual processor management module 242 may then determine the execution state of any additional virtual processors 231 that have been given execution control of a logical processor on the same CPU as the virtual processor that issued a VM exit. This determination may be made by accessing a data structure that maintains the execution state of all virtual processors managed by the hypervisor. Continuing with the example noted above, when exit processing module 241 detects a VM exit issued by virtual processor 231-A, virtual processor management module 242 may then determine the execution state of virtual processor 231-B.

As noted above, different actions may be taken based on the determined execution state(s) of any additional virtual processors with execution control of logical processors on the same CPU. Thus, if virtual processor 231-B has an execution state that indicates it is running, virtual processor management module 242 may take action to halt logical processor 202-B in order to suspend virtual processor 231-B. Alternatively, if virtual processor 231-B has an execution state that indicates it has already been halted (e.g., a VM HALT has been issued because virtual processor 231-B is idle), virtual processor management module 242 may take action to transfer execution control of logical processor 202-A to hypervisor 235 to execute a hypervisor task. In this latter case, logical processor 202-B may also be utilized to execute a different hypervisor task, may be utilized for another task not related to VM 230, or may remain in a halted state until the hypervisor task has completed.

Logical processor management module 243 is responsible for management of logical processors 202-A and 202-B of processing device 201. In some implementations, logical processor management module 243 can be invoked to complete the transfer of execution control of a logical processor 202 from a virtual processor 231 of VM 230 to hypervisor 235. Logical processor management module 243 can also be invoked to return execution control of a logical processor 202 to a virtual processor 231 once a hypervisor task has been completed.

In an illustrative example, virtual processor 231-A issues a VM exit to transfer execution control of logical processor 202-A to hypervisor 235. Responsive to virtual processor management module 242 determining that the execution state of virtual processor 231-B indicates that it is running, logical processor management module 243 may be invoked to send an instruction to logical processor 202-B (the logical processor associated with virtual processor 231-B) to cause the virtual processor 202-B to return control to hypervisor 235. In some implementations, logical processor management module 243 may send an inter-processor interrupt (IPI) to logical processor 202-B by invoking interrupt processing module 244. The IPI can cause logical processor 202-B to cause virtual processor 231-B to return control to the hypervisor 235. Thus, virtual processor 231-B should not execute a VM related task while hypervisor 235 retains execution control of logical processor 202-A. Once logical processor 202-B has returned control to hypervisor 235 (e.g., the logical processor has been halted), logical processor management module 243 can then send an instruction to logical processor 202-A to transfer execution control to hypervisor 235. In some implementations, logical processor management module 243 may determine that logical processor 202-B has returned control to hypervisor 235 by receiving a notification from logical processor 202-B that it has returned control.

Subsequently, once hypervisor 235 has completed executing its task using logical processor 202-A, logical processor management module 243 may facilitate returning control of logical processors 202-A and 202-B to their respective VM related tasks. Logical processor management module 243 may then invoke interrupt processing module 244 to send an IPI to logical processor 202-B to cause virtual processor 231-B to re-enter VM 230. Similarly, logical processor management module 243 may also invoke interrupt processing module 244 to send an IPI to logical processor 202-A to cause virtual processor 231-A to re-enter VM 230.

The above process may be completed differently if virtual processor 231-A initially issues a VM exit with the expectation that execution control of logical processor 202-A should not be immediately returned to the VM (e.g., a VM HALT), depending on the execution state of virtual processor 231-B. For example, if virtual processor 231-B is already in a halted state when virtual processor 231-A issues a HALT, then this could indicate that execution control should not be returned to the VM 230 (e.g., either one of virtual processors 231-A or 231-B) for either logical processor 202. As such, both logical processors 202-A and 202-B can be assigned to execute other tasks that are not related to VM 230. For example, logical processors 202-A and 202-B may be used for hypervisor tasks. Alternatively, both logical processors could be assigned to execute tasks for virtual processors of a different VM (not pictured). If, on the other hand, virtual processor 231-B is executing when virtual processor 231-A issues a HALT of logical processor 202-A, then virtual processor 231-B may remain executing while logical processor 202-A is halted. Thus, hypervisor 235 should be prevented from executing simultaneously with virtual processor 231-B. Safe hyper-threading for virtual machines based on detecting a VM HALT is described below with respect to FIG. 4.

As noted above, if exit processing module 241 determines that virtual processor 231-A issued a HALT, virtual processor management module 242 may be invoked to determine whether VM 230 has an additional virtual processor 231-B that is associated with another logical processor on the same CPU (e.g., logical processor 202-B). Virtual processor management module 242 may then determine the execution state of virtual processor 231-B. If virtual processor management module 242 determines that the execution state of the virtual processor 231-B indicates that it is already halted, logical processor management module 243 may be invoked to send an instruction to the logical processor 202-B to cause it to execute a task that is not associated with the VM 230 (e.g., a task for another VM). Similarly, logical processor management module 243 may also be invoked to send an instruction to logical processor 202-A to cause it to also execute a task that is not associated with the VM 230 (e.g., a task for another VM).

If, on the other hand, virtual processor management module 242 determines that (at the time virtual processor 231-B executed the HALT) the execution state of the virtual processor 231-B indicates that it is running, logical processor management module 243 may be invoked to send an instruction only to logical processor 202-A to HALT logical processor 202-A. As noted above, this instruction could be an IPI instruction. Alternatively, logical processor management module 243 may set an indicator that prevents the hypervisor from executing a hypervisor related task using logical processor 202-A. In some implementations, this indicator may be stored in a register, data structure, memory space, or other similar structure, that is checked by hypervisor 235 prior to executing a hypervisor related task.

Subsequently, logical processor management module 243 may detect that logical processor 202-A is available execute the virtual processor 231-A (e.g., it is available to re-enter the VM 230). This may occur once any scheduled hypervisor tasks or other tasks not related VM 230 have completed and returned control to the hypervisor. At this time, logical processor management module 243 checks the execution state of logical processor 202-B (or any other logical processors on the same CPU as logical processor 202-A). If logical processor 202-A is halted, logical processor management module 243 can invoke interrupt processing module 244 to send an IPI instruction to logical processor 202-A to cause it re-enter VM 230 (e.g., by returning execution control to virtual processor 231-A). Thus, logical processor 202-B can execute VM code without conflict, since logical processor 202-A not executing a hypervisor task. If, on the other hand, logical processor 202-B is executing a hypervisor task, logical processor management module 243 can invoke interrupt processing module 244 to send an IPI instruction to logical processor 202-A to HALT logical processor 202-A. Thus, logical processor 202-A will not simultaneously execute VM code while logical processor 202-B is still executing a hypervisor task.

Figure 3:
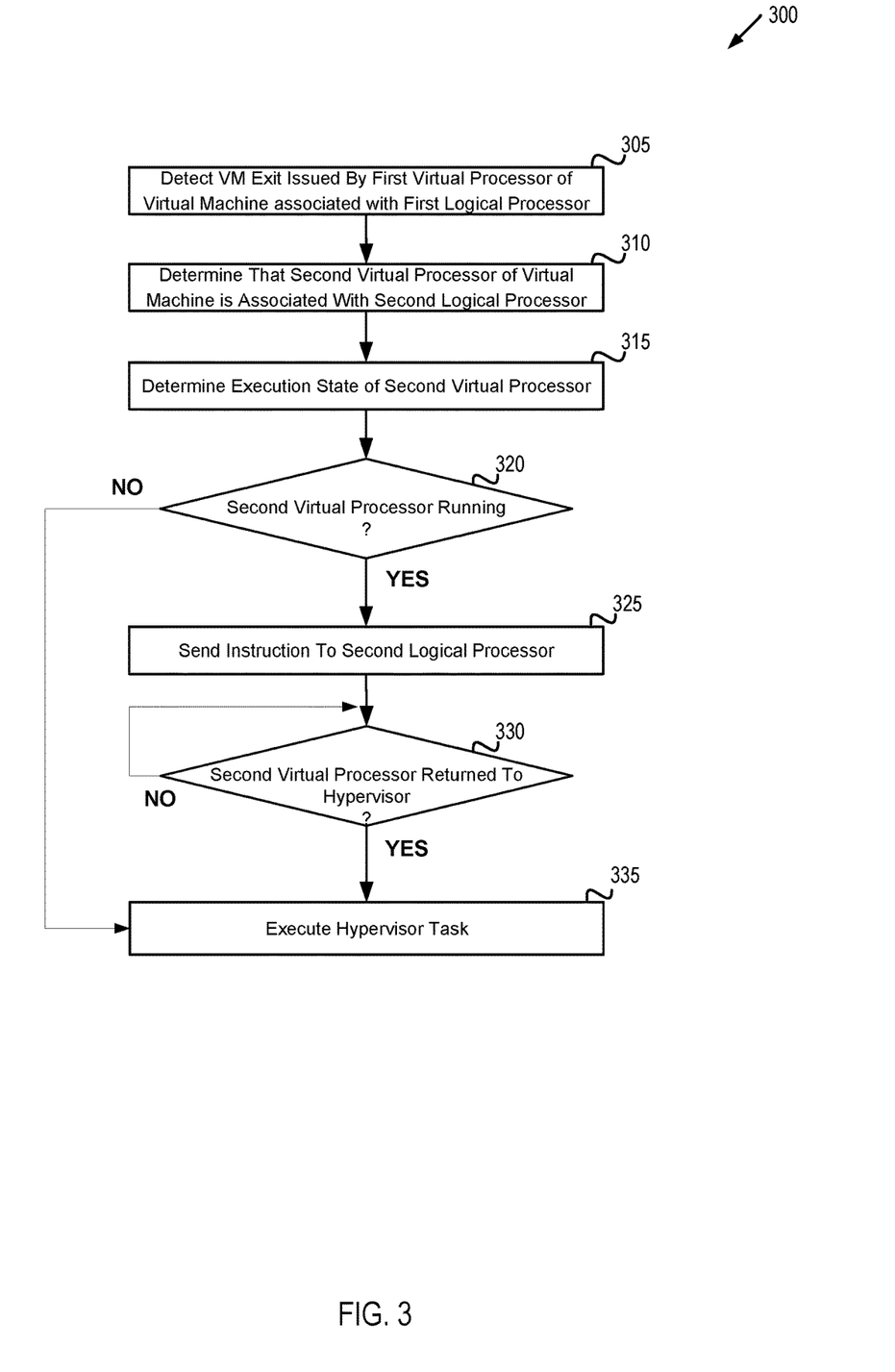
FIG. 3 depicts a flow diagram of a method for safe hyper-threading for virtual machines based on VM Exits, in accordance with one or more aspects of the present disclosure.

FIG. 3 depicts a flow diagram of an example method 300 for safe hyper-threading for virtual machines based on VM Exits. The method may be performed by processing logic that may comprise hardware (circuitry, dedicated logic, etc.), computer readable instructions (run on a general purpose computer system or a dedicated machine), or a combination of both. In an illustrative example, method 300 may be performed by hyper-thread manager 140 of hypervisor 125 in FIG. 1, or hyper-thread manager 240 of hypervisor 235 in FIG. 2. Alternatively, some or all of method 300 might be performed by another module or machine. It should be noted that blocks depicted in FIG. 3 could be performed simultaneously or in a different order than that depicted.

At block 305, processing logic detects a VM exit issued by first virtual processor of a virtual machine, where the first virtual processor is associated with a first logical processor of a host CPU. At block 310, processing logic determines that a second virtual processor of the virtual machine is associated with a second logical processor of the host CPU. At block 315, processing logic determines an execution state of the second virtual processor. In some implementations, processing logic makes this determination by receiving a notification from the second virtual processor that the second virtual processor has executed a VM exit to return control to the hypervisor. At block 320, processing logic determines whether the execution state of the second virtual processor indicates that it is running. If so, processing proceeds to block 325. If so, processing continues to block 325. Otherwise, processing proceeds to block 335.

At block 325, processing logic sends a first instruction to the second logical processor to cause the second virtual processor to return control to the hypervisor. In some implementations, the first instruction is an inter-processor interrupt instruction. At block 330, processing logic determines whether the execution state of the second virtual processor indicates that the second virtual processor has returned control to the hypervisor. If so, processing proceeds to block 335. Otherwise, processing returns to block 330. At block 335, processing logic executes a hypervisor task using the first logical processor. After block 335, the method of FIG. 3 terminates.

Figure 4:
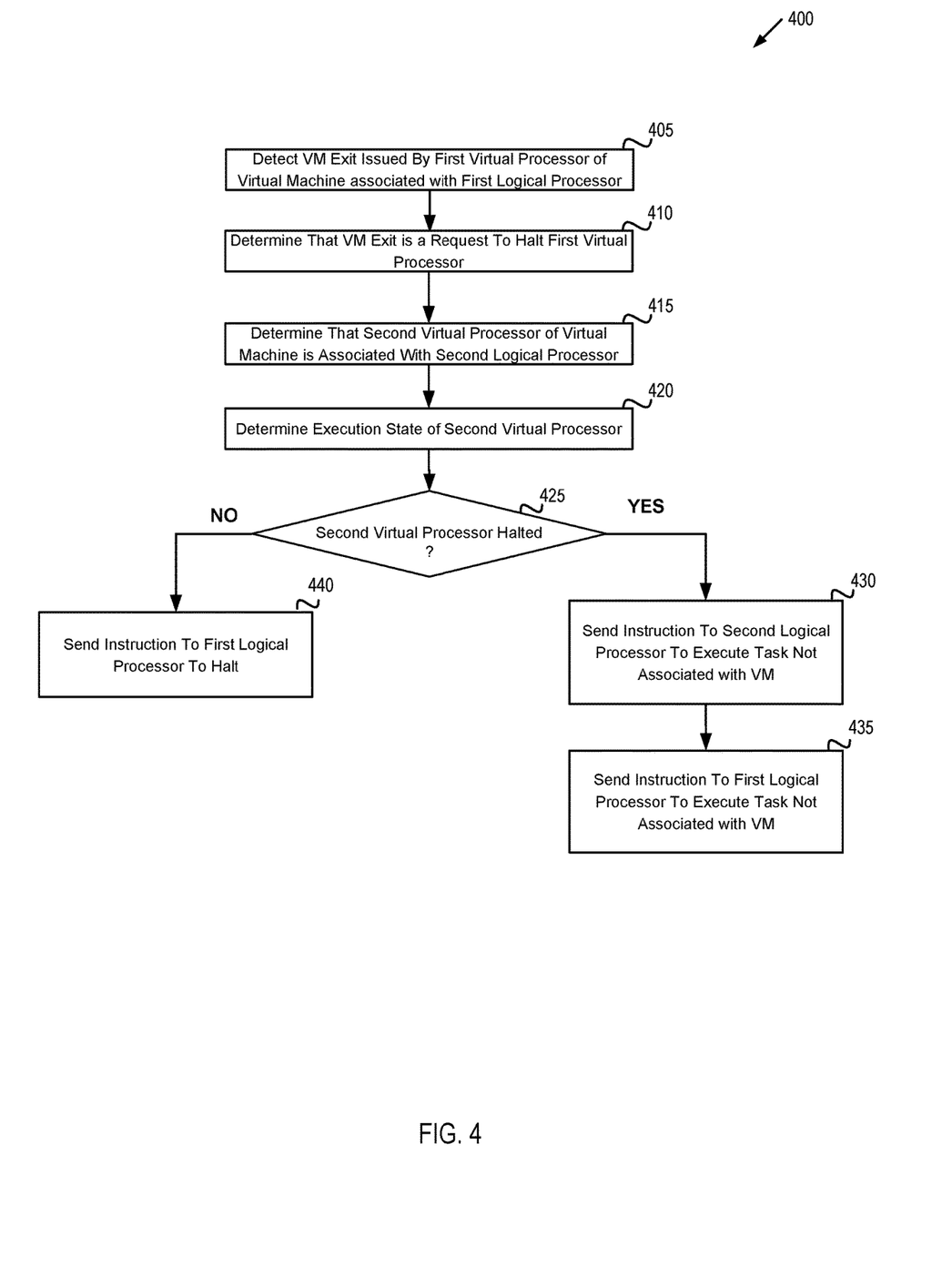
FIG. 4 depicts a flow diagram of a method for safe hyper-threading for virtual machines based on VM HALTs, in accordance with one or more aspects of the present disclosure.

FIG. 4 depicts a flow diagram of an example method 400 for safe hyper-threading for virtual machines based on VM HALTs. The method may be performed by processing logic that may comprise hardware (circuitry, dedicated logic, etc.), computer readable instructions (run on a general purpose computer system or a dedicated machine), or a combination of both. In an illustrative example, method 400 may be performed by hyper-thread manager 140 of hypervisor 125 in FIG. 1, or hyper-thread manager 240 of hypervisor 235 in FIG. 2. Alternatively, some or all of method 400 might be performed by another module or machine. It should be noted that blocks depicted in FIG. 4 could be performed simultaneously or in a different order than that depicted.

At block 405, processing logic detects a VM exit issued by first virtual processor of a virtual machine, where the first virtual processor is associated with a first logical processor of a host CPU. At block 410, processing logic determines that the VM exit issued by the first virtual processor is a request to HALT the first virtual processor (e.g., a VM HALT instruction). At block 415, processing logic determines that a second virtual processor of the virtual machine is associated with a second logical processor of the host CPU. At block 420, processing logic determines an execution state of the second virtual processor.

At block 425, processing logic determines whether the execution state of the second virtual processor indicates that the second virtual processor is halted. If so, processing logic continues to block 430. At block 430, processing logic sends a first instruction to the second logical processor to cause the second logical processor to execute a first task not associated with the virtual machine. In some implementations, this instruction may be an IPI instruction. In some implementations, the first task may be a hypervisor related task or a scheduling task associated with a virtual processor of another virtual machine.

At block 435, processing logic a second instruction to the first logical processor to cause the first logical processor to execute a second task not associated with the virtual machine. In some implementations, this instruction may be an IPI instruction. In some implementations, the second task may be a hypervisor related task or a scheduling task associated with a virtual processor of another virtual machine. After block 435, the method of FIG. 4 terminates If, at block 425, processing logic determines that the execution state of the second virtual processor indicates that the second virtual processor is running, processing proceeds to block 440. At block 440, processing logic sends an instruction to the first logical processor to halt the first logical processor. In some implementations, this instruction may be an IPI instruction. In some implementations, processing logic may halt the first logical processor by setting an indicator in a memory space that prevents the hypervisor from executing a hypervisor related task using the first logical processor. After block 440, the method of FIG. 4 terminates.

Figure 5:
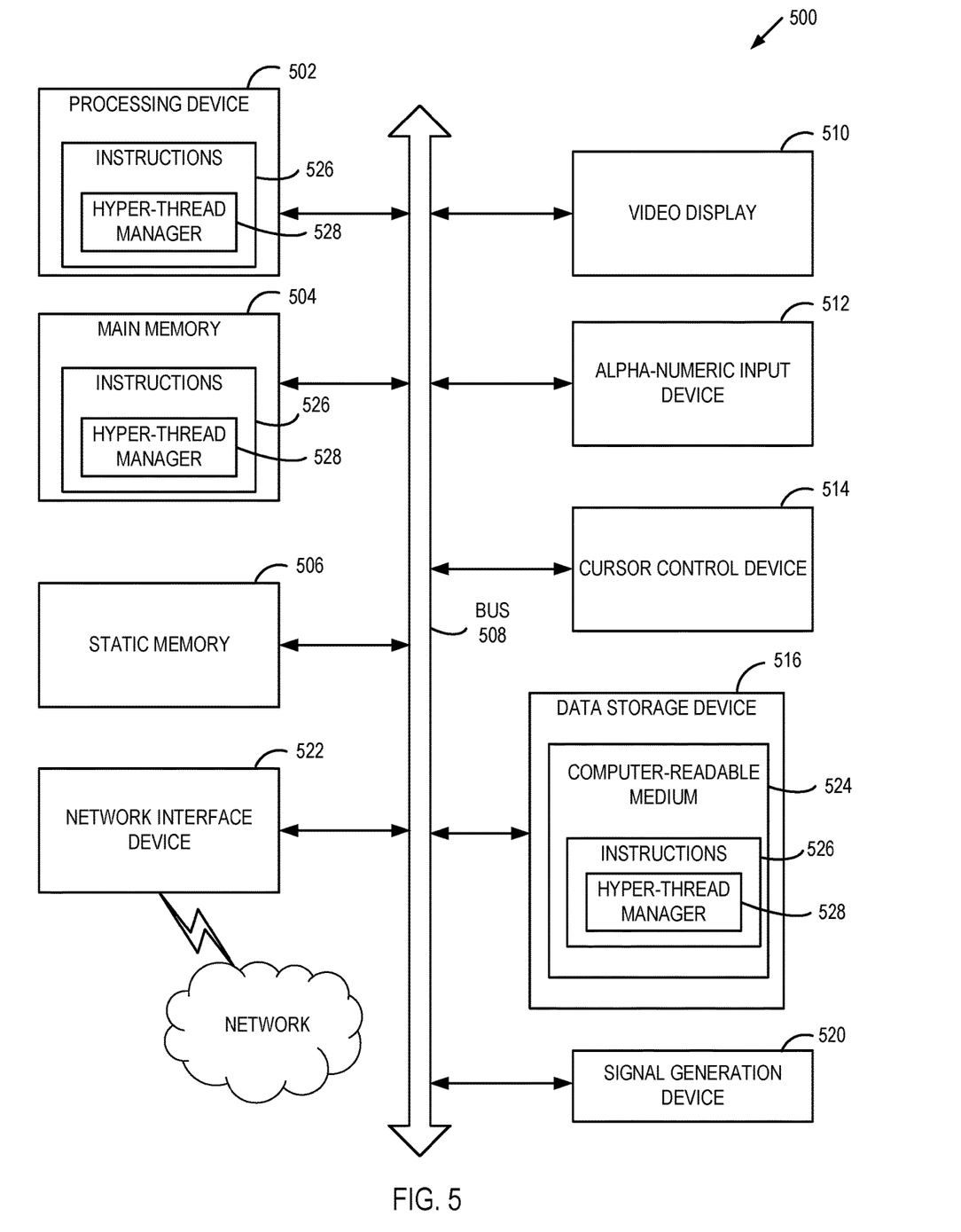
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes hyper-thread manager 528 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include hyper-thread manager 528 (e.g., corresponding to the methods of FIGS. 3-4, etc.) embodying any one or more of the methodologies or functions described herein. Hyper-thread manager 528 may also reside, completely or at least partially, within the main memory 504 and/or within the processing device 502 during execution thereof by the computer system 500, the main memory 504 and the processing device 502 also constituting computer-readable media. Hyper-thread manager 528 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "detecting," "determining," "sending," "executing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:

detecting, by a processing device executing a hypervisor, a first virtual machine (VM) exit issued by a first virtual processor of a virtual machine, wherein the first virtual processor is associated with a first logical processor of a host CPU;

determining that a second virtual processor of the virtual machine is associated with a second logical processor of the host CPU;

determining an execution state of the second virtual processor;

responsive to determining that the execution state of the second virtual processor indicates that the second virtual processor is running, sending, by the processing device executing the hypervisor, a first instruction to the second logical processor to cause the second virtual processor to return control to the hypervisor;

setting, in a memory, an indicator that prevents execution, by the second logical processor, of a task associated with the virtual machine; and responsive to determining that the execution state of the second virtual processor indicates that the second virtual processor has returned control to the hypervisor, executing, by the processing device executing the hypervisor, a hypervisor task using the first logical processor.

2. The method of claim 1, further comprising:

responsive to determining that the hypervisor task has completed, sending a second instruction to the second logical processor to cause the second virtual processor to re-enter the virtual machine.

3. The method of claim 2, further comprising:

sending a third instruction to the first logical processor to cause the first virtual processor to re-enter the virtual machine.

4. The method of claim 1, wherein the first instruction comprises an inter-processor interrupt (IPI) instruction.

5. The method of claim 1, wherein determining that the execution state of the second virtual processor indicates that the second virtual processor has returned control to the hypervisor comprises:

receiving a notification from the second virtual processor that the second virtual processor has executed a second VM exit to return control to the hypervisor.

6. The method of claim 1, wherein the first logical processor comprises a first hyper-thread of the host CPU and the second logical processor comprises a second hyper-thread of the host CPU.

7. The method of claim 1, further comprising:
responsive to determining that the execution state of the second virtual processor indicates that the second virtual processor has halted,
executing the hypervisor task using the first logical processor, and
responsive to determining that the hypervisor task has completed, sending a second instruction to the first logical processor to cause the first virtual processor to re-enter the virtual machine.

8. A computing apparatus comprising:
a memory; and
a processing device, operatively coupled to the memory, to execute a hypervisor to:
detect, by the hypervisor, a virtual machine (VM) exit issued by a first virtual processor of a virtual machine, wherein the first virtual processor is associated with a first logical processor of a host CPU;
determine that the VM exit issued by the first virtual processor halted the first virtual processor;
determine that a second virtual processor of the virtual machine is associated with a second logical processor of the host CPU;
determine an execution state of the second virtual processor;
responsive to determining that the execution state of the second virtual processor indicates that the second virtual processor is running, set, in the memory, an indicator that prevents the hypervisor from executing, using the first logical processor, a hypervisor related task; and
responsive to determining that the execution state of the second virtual processor indicates that the second virtual processor is halted,
send, by the hypervisor, a first instruction to the second logical processor to cause the second logical processor to execute a first task not associated with the virtual machine, and
send, by the hypervisor, a second instruction to the first logical processor to cause the first logical processor to execute a second task not associated with the virtual machine.

9. The computing apparatus of claim 8, wherein the processing device is further to:
responsive to determining that the execution state of the second virtual processor indicates that the second virtual processor is running, send a third instruction to the first logical processor to halt the first logical processor.

10. The computing apparatus of claim 8, wherein the first task comprises at least one of the hypervisor related task or a scheduling task associated with a third virtual processor of a second virtual machine.

11. The computing apparatus of claim 8, wherein the second task comprises at least one of the hypervisor related task or a scheduling task associated with a third virtual processor of a second virtual machine.

12. The computing apparatus of claim 8, wherein the processing device is further to:
detect that the first logical processor is available to execute the first virtual processor of the virtual machine;
responsive to determining that the second logical processor is halted, send a third instruction to the first logical processor to cause the first virtual processor to re-enter the virtual machine.

13. The computing apparatus of claim 8, wherein the processing device is further to:
detect that the first logical processor is available to execute the first virtual processor of the virtual machine; and
responsive to determining that the second logical processor is executing a hypervisor task, send a third instruction to the first logical processor to halt the first logical processor.

14. A non-transitory computer readable storage medium, having instructions stored therein, which when executed by a processing device of a computer system, cause the processing device to:
detect, by the processing device executing a hypervisor, a first virtual machine (VM) exit issued by a first virtual processor of a virtual machine, wherein the first virtual processor is associated with a first logical processor of a host CPU;
determine that a second virtual processor of the virtual machine is associated with a second logical processor of the host CPU;
determine an execution state of the second virtual processor;
responsive to determining that the execution state of the second virtual processor indicates that the second virtual processor is running, send, by the hypervisor, a first inter-processor interrupt (IPI) instruction to the second logical processor to cause the second virtual processor to return control to the hypervisor;
set, in a memory, an indicator that prevents execution, by the second logical processor, of a task associated with the virtual machine; and
responsive to determining that the execution state of the second virtual processor indicates that the second virtual processor has returned control to the hypervisor, execute, by the hypervisor, a hypervisor task using the first logical processor.

15. The non-transitory computer readable storage medium of claim 14, wherein the processing device is further to:
responsive to determining that the hypervisor task has completed, send a second IPI instruction to the second logical processor to cause the second virtual processor to re-enter the virtual machine.

16. The non-transitory computer readable storage medium of claim 14, wherein the processing device is further to:
send a third IPI instruction to the first logical processor to cause the first virtual processor to re-enter the virtual machine.

17. The non-transitory computer readable storage medium of claim 14, wherein to determine that the execution state of the second virtual processor indicates that the second virtual processor has returned control to the hypervisor, the processing device is to:
receive a notification from the second virtual processor that the second virtual processor has executed a second VM exit to return control to the hypervisor.

18. The non-transitory computer readable storage medium of claim 14, wherein the first logical processor comprises a first hyper-thread of the host CPU and the second logical processor comprises a second hyper-thread of the host CPU.

19. The non-transitory computer readable storage medium of claim 14, wherein the processing device is further to:
responsive to determining that the execution state of the second virtual processor indicates that the second virtual processor has halted,
execute the hypervisor task using the first logical processor, and
responsive to determining that the hypervisor task has completed, send a second instruction to the first logical processor to cause the first virtual processor to re-enter the virtual machine.

\* \* \* \* \*